UNITED STATES PATENT OFFICE 2,009,566

METHOD FOR MAKING A REFRACTORY COMPOSITION

Edward R. Stowell, Fort Wayne, Ind., assignor of one-half to Worthington Hoyt, Cleveland Heights, Ohio No Drawing. Application March 29, 1934, Serial No. 717,950

3 Claims. (Cl. 106—5)

The object of this invention is to furnish a high temperature composition which can be de-poured to form, pressed to shape or applied with a trowel. One that will produce refractory units with increased green and dry modulus of rupture, lower porosity in the fired ware, and one that increases the mobility of the non-plastic content which is advantageous in the forming operations.

This composition consists of approximately 95 parts, by weight, silicon carbid, 50 mesh or finer, crystalline grade, run of mill, settling tank or canal fines preferred. Volclay a very pure grade of Wyoming bentonite 3 parts. Sodium metasilicate 2 parts. Water sufficient to make a thick paste. After having been well mixed to a thick paste the composition is let stand in a tank or vat for 24 hours or longer, this container to be covered but not sealed. At a temperature of 80 degrees F. and up there will be a formation of soluble silicate, and this will be absorbed by the Volclay, which is characterized by high plasticity and bond strength, high absorption, and by its property of swelling greatly when wet. And it will retain its green bond strength when heated to temperatures that would largely destroy that property in other clays.

As the Volclay particles are largely from 0.1 micron to 0.5 micron in size, and as there will be some soluble silicate developed in each grain of the silicon carbid, and this will be absorbed by the Volclay which will expand 10 to 12 times its dry bulk, practically every void in the mixture will be filled, and a uniform green bond will be had up to that temperature the Volclay will mature into a ceramic bond; i. e. Seger cone 6 to 8.

The proportions of the ingredients recited above are regarded as optimum but they may be departed from to a considerable extent at the same time securing satisfactory results. These proportions therefore when recited herein are not to be read in a limiting sense but as including such ranges of departure from the optimum as will still give satisfactory results and secure the advantages of the invention to a substantial degree.

Having thus described my invention, what I claim is:

1. A method comprising mixing silicon carbid, bentonite, sodium metasilicate in proportions of the order of 93, 3 and 2 parts by weight respectively and water enough to form a thick paste, and allowing same to stand in a covered container until it reaches its maximum bulk.

2. A method comprising mixing about 95 parts by weight crystalline silicon-carbid, 50 mesh and finer, preferably the run of mill, settling tank or canal fines, about 3 parts of bentonite, and about 2 parts sodium metasilicate, same to be mixed to a thick paste with water, and when so mixed placed in a covered container for sufficient time to permit the bentonite to absorb the silicate solution which will be formed by the alkali in this composition.

3. A method comprising mixing silicon carbid, bentonite, sodium metasilicate in proportions of the order of 95, 3 and 2 parts by weight respectively and water enough to form a thick paste and allowing the same to stand in a container which is covered but not sealed, at a temperature of the order of 80° F. for a time of the order of twenty-four hours.

EDWARD R. STOWELL.